(12) United States Patent
Tokumasu et al.

(10) Patent No.: US 11,736,036 B2
(45) Date of Patent: Aug. 22, 2023

(54) ELECTRIC POWER CONVERTER

(71) Applicant: DENSO CORPORATION, Kariya (JP)

(72) Inventors: Akira Tokumasu, Kariya (JP); Yousuke Watanabe, Kariya (JP)

(73) Assignee: DENSO CORPORATION, Kariya (JP)

(*) Notice: Subject to any disclaimer, the term of this patent is extended or adjusted under 35 U.S.C. 154(b) by 116 days.

(21) Appl. No.: 17/503,828

(22) Filed: Oct. 18, 2021

(65) Prior Publication Data
US 2022/0038027 A1 Feb. 3, 2022

Related U.S. Application Data

(63) Continuation of application No. PCT/JP2020/015099, filed on Apr. 1, 2020.

(30) Foreign Application Priority Data

Apr. 16, 2019 (JP) ................. 2019-077936

(51) Int. Cl.
*H02M 7/537* (2006.01)
*H02M 1/088* (2006.01)

(52) U.S. Cl.
CPC ........... *H02M 7/537* (2013.01); *H02M 1/088* (2013.01)

(58) Field of Classification Search
CPC ...... H02M 1/0006; H02M 1/08; H02M 1/088; H02M 7/537; H02M 7/5387; H02M 7/797

USPC ........................................................ 327/540
See application file for complete search history.

(56) References Cited

U.S. PATENT DOCUMENTS

| 2015/0085536 A1 | 3/2015 | Miyauchi et al. |
| 2015/0364984 A1 | 12/2015 | Miyauchi et al. |
| 2018/0309429 A1 | 10/2018 | Araragi |

FOREIGN PATENT DOCUMENTS

| JP | H11-018444 A | 1/1999 |
| JP | 2008-061290 A | 3/2008 |

*Primary Examiner* — Menatoallah Youssef
*Assistant Examiner* — Dave Mattison
(74) *Attorney, Agent, or Firm* — Oliff PLC

(57) ABSTRACT

An electric power converter includes a plurality of switch pairs respectively corresponding to a plurality of phases and each consisting of an upper-arm switch and a lower-arm switch. Each of the lower-arm switches of the switch pairs has a first terminal, a second terminal and a gate. The electric power converter further includes: a voltage generation circuit having its positive electrode side connected to the second terminal of only one of the lower-arm switches of the switch pairs; a negative-electrode-side electrical path connected to a negative electrode side of the voltage generation circuit; and at least one capacitor having a first end connected to the second terminal of one of the remainder of the lower-arm switches of the switch pairs, which is not connected with the voltage generation circuit, and a second end connected to the negative-electrode-side electrical path.

7 Claims, 16 Drawing Sheets

FIG.3 <COMPARATIVE EXAMPLE>

US 11,736,036 B2

ELECTRIC POWER CONVERTER

CROSS-REFERENCE TO RELATED APPLICATIONS

The present application is a continuation application of International Application No. PCT/JP2020/015099 filed on Apr. 1, 2020, which is based on and claims priority from Japanese Patent Application No. 2019-077936 filed on Apr. 16, 2019. The entire contents of these applications are incorporated by reference into the present application.

BACKGROUND

1. Technical Field

The present disclosure relates to electric power converters.

2. Description of Related Art

As a known electric power converter, there is disclosed, for example in Japanese Patent Application Publication No. JP 2008-061290 A, an inverter that includes a plurality of switch pairs respectively corresponding to a plurality of phases and each consisting of an upper-arm switch and a lower-arm switch.

SUMMARY

According to the present disclosure, there is provided an electric power converter comprising a plurality of switch pairs respectively corresponding to a plurality of phases and each consisting of an upper-arm switch and a lower-arm switch. Each of the lower-arm switches of the switch pairs has a first terminal, a second terminal and a gate. Each of the lower-arm switches is configured to be turned to an ON state in response to a potential difference of the gate with respect to the second terminal becoming higher than or equal to a threshold voltage and turned to an OFF state in response to the potential difference becoming lower than the threshold voltage. Each of the lower-arm switches allows electric current to flow from the first terminal to the second terminal in the ON state and blocks electric current from flowing from the first terminal to the second terminal in the OFF state. The electric power converter further includes: a voltage generation circuit having its positive electrode side connected to the second terminal of only one of the lower-arm switches of the switch pairs; a negative-electrode-side electrical path connected to a negative electrode side of the voltage generation circuit; and at least one capacitor having a first end connected to the second terminal of one of the remainder of the lower-arm switches of the switch pairs, which is not connected with the voltage generation circuit, and a second end connected to the negative-electrode-side electrical path.

DESCRIPTION OF EMBODIMENTS

Figure 1:
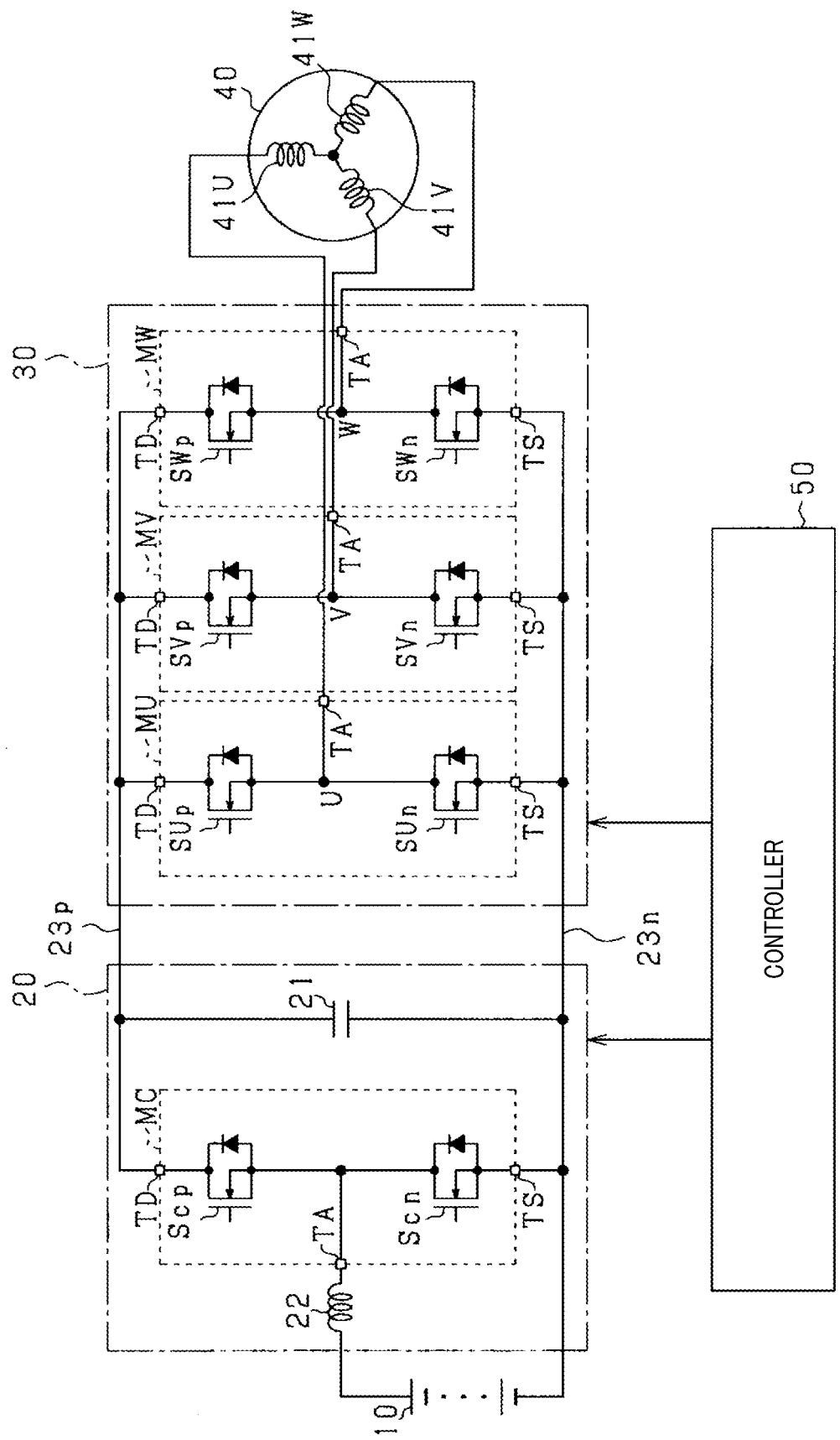
FIG. 1 is a schematic circuit diagram illustrating the overall configuration of a control system according to a first embodiment.

In a known electric power converter, each of the lower-arm switches of the switch pairs for respective phases has a first terminal, a second terminal and a gate. Each of the lower-arm switches is configured to be turned to an ON state in response to a potential difference of the gate with respect to the second terminal (or gate voltage) becoming higher than or equal to a threshold voltage and turned to an OFF state in response to the potential difference becoming lower than the threshold voltage. Each of the lower-arm switches allows electric current to flow from the first terminal to the second terminal in the ON state and blocks electric current from flowing from the first terminal to the second terminal in the OFF state.

However, in the OFF state, the gate voltage may become higher than or equal to the threshold voltage upon supply of electric charge to the gate via, for example, a parasitic capacitor of the lower-arm switch. Consequently, self turn-on would occur which is a phenomenon where the lower-arm switch is erroneously turned to the ON state even though the lower-arm switch is desired to be kept in the OFF state.

To suppress occurrence of self turn-on, one may consider providing each of the lower-arm switches individually with a voltage generation circuit for supplying a negative gate voltage to the gate of the lower-arm switch. However, in this case, the configuration of the electric power converter would become complicated since it is necessary to employ a plurality of voltage generation circuits respectively for the lower-arm switches of the switch pairs for respective phases.

The present disclosure has been accomplished in view of the above problems. In the above-described electric power converter according to the present disclosure, the voltage generation circuit is provided for only one of the lower-arm switches of the switch pairs. Consequently, it becomes possible to simplify the configuration of the electric power converter in comparison with the case of providing a plurality of voltage generation circuits respectively for all the lower-arm switches of the switch pairs. Moreover, in the above-described electric power converter according to the present disclosure, to the negative electrode side of the voltage generation circuit, there is connected the negative-electrode-side electrical path. Consequently, with the negative-electrode-side electrical path and the at least one capacitor, it becomes possible to supply a negative gate voltage also to the gate of each of the remainder of the lower-arm switches not connected with the voltage generation circuit.

As above, according to the present disclosure, with the simple configuration including the single voltage generation circuit, the negative-electrode-side electrical path and the at least one capacitor, it becomes possible to supply a negative gate voltage to all the gates of the lower-arm switches of the switch pairs.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, explanation of identical components will not be repeated.

First Embodiment

FIG. 1 illustrates the overall configuration of a control system according to the first embodiment.

As shown in FIG. 1, the control system includes a DC power supply 10, an electric power converter that includes a DC-to-DC converter 20 and an inverter 30, a rotating electric machine 40 and a controller 50.

The DC power supply 10 is a storage battery having a terminal voltage of 100V or higher. The DC power supply 10 may be implemented by, for example, a secondary battery such as a lithium-ion battery or a nickel-metal hydride battery.

The rotating electric machine 40 is an in-vehicle main machine. More particularly, in the present embodiment, the rotating electric machine 40 is configured as a three-phase rotating electric machine to include a U-phase winding 41U, a V-phase winding 41V and a W-phase winding 41W. In addition, the rotating electric machine 40 may be implemented by, for example, a permanent magnet synchronous machine.

The DC-to-DC converter 20 includes a capacitor 21, a reactor 22, an upper-arm boost switch Scp and a lower-arm boost switch Scn. In the present embodiment, each of the upper-arm and lower-arm boost switches Scp and Scn is configured with an N-channel MOSFET (Metal-Oxide-Semiconductor Field-Effect Transistor) that is an SiC device. Moreover, each of the upper-arm and lower-arm boost switches Scp and Scn has a body diode formed therein. The DC-to-DC converter 20 is configured to boost, through switching operation of the upper-arm and lower-arm boost switches Scp and Scn, the output voltage of the DC power supply 10 and output the boosted voltage.

In the present embodiment, the upper-arm and lower-arm boost switches Scp and Scn are together modularized to form a boost module MC. The boost module MC is shaped in a flat rectangular solid. The boost module MC includes three terminals, i.e., a drain terminal TD, a source terminal TS and a connection terminal TA. The drain terminal TD has the drain (corresponding to a first terminal) of the upper-arm boost switch Scp connected thereto, while the source terminal TS has the source (corresponding to a second terminal) of the lower-arm boost switch Scn connected thereto. On the other hand, the connection terminal TA has both the source of the upper-arm boost switch Scp and the drain of the lower-arm boost switch Scn connected thereto.

Moreover, to the connection terminal TA of the boost module MC, there is also connected a first end of the reactor 22. Further, to a second end of the reactor 22, there is connected a positive electrode terminal of the DC power supply 10. Furthermore, a positive-electrode-side conductive member 23p is connected with the drain terminal TD of the boost module MC while a negative-electrode-side conductive member 23n is connected with the source terminal TS of the boost module MC. In addition, the negative-electrode-side conductive member 23n is also connected with a negative electrode terminal of the DC power supply 10.

The inverter 30 includes three switch pairs respectively corresponding to the three phases of the rotating electric machine 40 and each consisting of an upper-arm switch and a lower-arm switch that are electrically connected in series with each other. More specifically, the inverter 30 includes: a U-phase switch pair consisting of a U-phase upper-arm switch SUp and a U-phase lower-arm switch SUn that are electrically connected in series with each other; a V-phase switch pair consisting of a V-phase upper-arm switch SVp and a V-phase lower-arm switch SVn that are electrically connected in series with each other; and a W-phase switch pair consisting of a W-phase upper-arm switch SWp and a W-phase lower-arm switch SWn hat are electrically connected in series with each other. In the present embodiment, each of the upper-arm and lower-arm switches SUp, SUn, SVp, SVn, SWp and SWn is configured with an N-channel MOSFET. Moreover, each of the upper-arm and lower-arm switches SUp, SUn, SVp, SVn, SWp and SWn has a body diode formed therein.

Furthermore, the U-phase upper-arm and lower-arm switches SUp and SUn are together modularized to form a U-phase module MU. Similarly, the V-phase upper-arm and lower-arm switches SVp and SVn are together modularized to form a V-phase module MV. The W-phase upper-arm and lower-arm switches SWp and SWn are together modularized to form a W-phase module MW.

In the present embodiment, each of the U-phase, V-phase and W-phase modules MU, MV and MW has the same configuration as the boost module MC. Therefore, detailed explanation of the U-phase, V-phase and W-phase modules MU, MV and MW is omitted hereinafter. In addition, for the sake of convenience, all the drain terminals of the U-phase, V-phase and W-phase modules MU, MV and MW are designated by the same reference sign TD as the drain terminal of the boost module MC; all the source terminals of the U-phase, V-phase and W-phase modules MU, MV and MW are designated by the same reference sign TS as the source terminal of the boost module MC; and all the connection terminals of the U-phase, V-phase and W-phase modules MU, MV and MW are designated by the same reference sign TA as the connection terminal of the boost module MC.

The positive-electrode-side conductive member 23p is connected with each of the drain terminals TD of the U-phase, V-phase and W-phase modules MU, MV and MW, while the negative-electrode-side conductive member 23n is connected with each of the source terminals TS of the U-phase, V-phase and W-phase modules MU, MV and MW.

Specifically, each of the conductive members 23p and 23n is shaped to be long in one direction (i.e., longitudinal direction). More particularly, in the present embodiment, each of the conductive members 23p and 23n is constituted of a busbar. To the positive-electrode-side conductive member 23p, there are sequentially connected, from one end side thereof, the drain terminal TD of the U-phase module MU, the drain terminal TD of the V-phase module MV, the drain terminal TD of the W-phase module MW and the drain terminal TD of the boost module MC in this order. Similarly, to the negative-electrode-side conductive member 23n, there are sequentially connected, from one end side thereof, the source terminal TS of the U-phase module MU, the source terminal TS of the V-phase module MV, the source terminal TS of the W-phase module MW and the source terminal TS of the boost module MC in this order.

To the connection terminal TA of the U-phase module MU, there is connected a first end of the U-phase winding 41U. Similarly, to the connection terminal TA of the V-phase module MV, there is connected a first end of the V-phase winding 41V. To the connection terminal TA of the W-phase module MU, there is connected a first end of the W-phase winding 41W. On the other hand, a second end of the U-phase winding 41U, a second end of the V-phase winding 41V and a second end of the W-phase winding 41W are connected together at a neutral point.

The controller 50 drives the DC-to-DC converter 20 and the inverter 30 so as to control a controlled variable of the rotating electric machine 40 to a command value thereof. The controller variable may be, for example, torque.

Specifically, to control the output voltage of the DC-to-DC converter 20 to a target value thereof, the controller 50 outputs drive signals of the boost switches Scp and Scn to drive ICs provided respectively for the boost switches Scp and Scn.

Moreover, to control switching (or on/off) operation of the upper-arm and lower-arm switches SUp, SUn, SVp, SVn, SWp and SWn of the inverter 30, the controller 50 outputs drive signals of these switches to drive ICs provided respectively for these switches. In addition, the controller 50 may generate the drive signals respectively corresponding to the drive ICs by, for example, a PWM process based on comparison in magnitude between U-phase, V-phase and W-phase command voltages and a carrier signal such as a triangular wave; the U-phase, V-phase and W-phase command voltages are offset in phase from each other by 120° in electrical angle.

Each of the drive signals may represent either an ON-command commanding ON-drive of the corresponding switch or an OFF-command commanding OFF-drive of the corresponding switch. More specifically, for each of the U-phase, V-phase and W-phase switch pairs of the inverter 30, the drive signal of the upper-arm switch of the switch pair and the drive signal of the lower-arm switch of the switch pair are alternately set to the ON-command; consequently, the upper-arm and lower-arm switches of the switch pair are alternately turned on. Similarly, for the upper-arm and lower-arm boost switches Scp and Scn of the DC-to-DC converter 20, the drive signal of the upper-arm boost switch Scp and the drive signal of the lower-arm boost switch Scn are alternately set to the ON-command; consequently, the upper-arm and lower-arm boost switches Scp and Scn are alternately turned on.

In addition, various functions of the controller 50 may be realized by software stored in a tangible memory device and a computer that executes the software, by hardware, or by a combination of the aforementioned means.

Hereinafter, the inverter 30 according to the present embodiment will be described in more detail with reference to FIG. 2.

First, the upper-arm configuration of the inverter 30 will be described.

Figure 2:
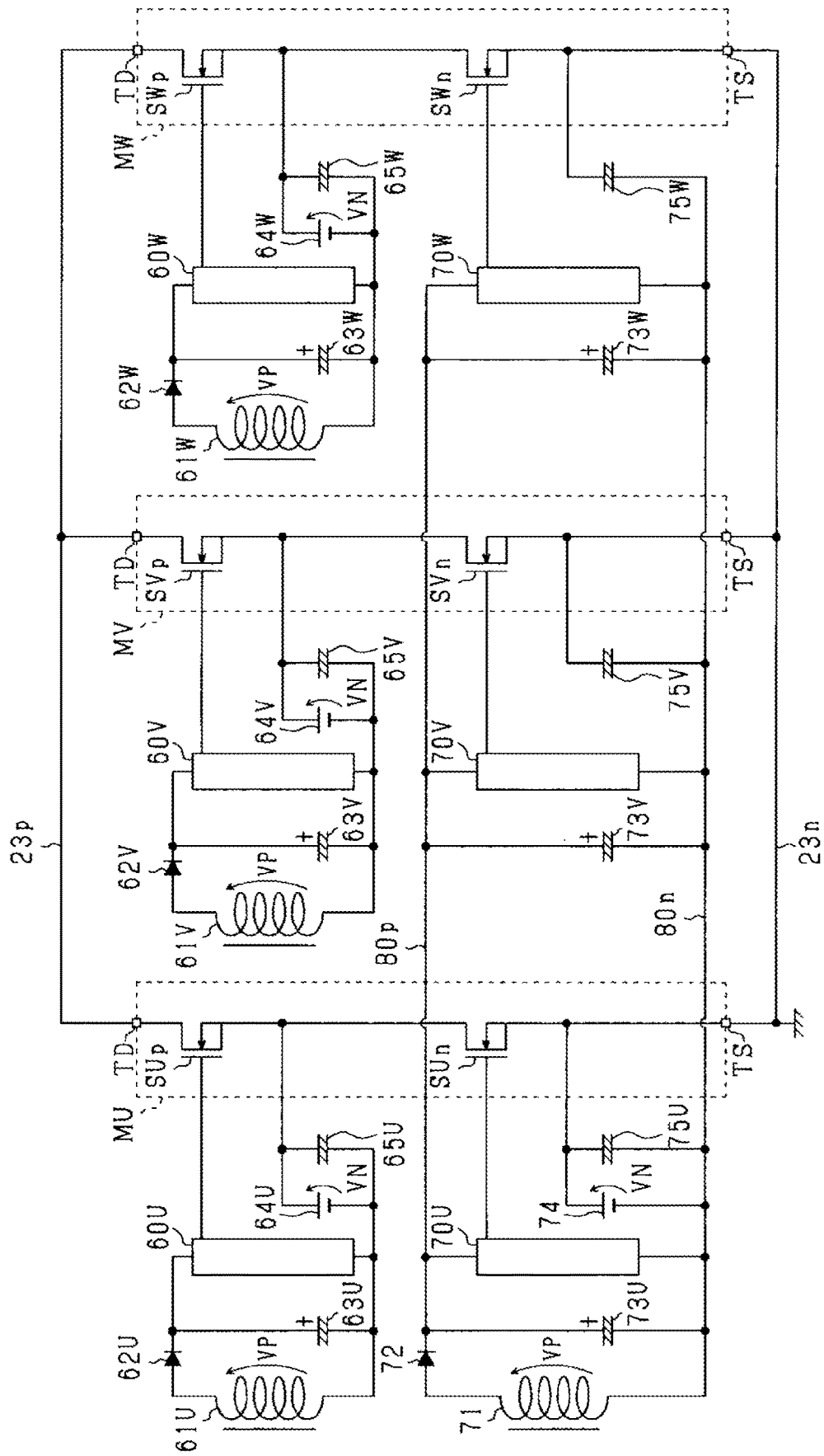
FIG. 2 is a schematic circuit diagram showing drive ICs of upper-arm and lower-arm switches and their peripheral devices in an inverter of the control system according to the first embodiment.

As shown in FIG. 2, for the U-phase, V-phase and W-phase upper-arm switches SUp, SVp and SWp, there are respectively provided drive ICs 60U, 60V and 60W. Moreover, electric power is supplied to the drive ICs 60U, 60V and 60W from insulated power supplies provided respectively for the drive ICs 60U, 60V and 60W.

Specifically, for driving the U-phase upper-arm switch SUp, to a first end of a secondary coil 61U of a transformer, there is connected the anode of a diode 62U. Here, the secondary coil 61U constitutes the insulated power supply for the drive IC 60U. Further, to the cathode of the diode 62U, there are connected both a first end of a smoothing capacitor 63U and a power supply terminal of the drive IC 60U. On the other hand, to a second end of the secondary coil 61U, there are connected both a second end of the smoothing capacitor 63U and a ground terminal of the drive IC 60U.

Moreover, to the source of the U-phase upper-arm switch SUp, there are connected both a positive electrode terminal of a negative-voltage power supply 64U and a first end of a capacitor 65U. On the other hand, both a negative electrode terminal of the negative-voltage power supply 64U and a second end of the capacitor 65U are connected to the ground terminal of the drive IC 60U.

When the drive signal outputted from the controller 50 is set to the ON-command, the drive IC 60U supplies a power supply voltage VP (e.g., 20V), which is the voltage of the secondary coil 61U, to the gate of the U-phase upper-arm switch SUp. Consequently, the gate voltage of the U-phase upper-arm switch SUp becomes higher than or equal to a threshold voltage Vth, causing the U-phase upper-arm switch SUp to be turned to an ON state. In contrast, when the drive signal outputted from the controller 50 is set to the OFF-command, the drive IC 60U supplies a voltage (VP−VN) to the gate of the U-phase upper-arm switch SUp. Here, VN is a target value (e.g., 4V) of the output voltage of the negative-voltage power supply 64U, which is lower than the power supply voltage VP. With the supply of the voltage (VP−VN) to the gate of the U-phase upper-arm switch SUp, the gate voltage of the U-phase upper-arm switch SUp becomes lower than the threshold voltage Vth, causing the U-phase upper-arm switch SUp to be turned to an OFF state.

Similarly, for driving the V-phase upper-arm switch SVp, there are provided the drive IC 60V, a secondary coil 61V that constitutes the insulated power supply for the drive IC 60V, a diode 62V, a smoothing capacitor 63V, a negative-voltage power supply 64V and a capacitor 65V. Moreover, for driving the W-phase upper-arm switch SWp, there are provided the drive IC 60W, a secondary coil 61W that constitutes the insulated power supply for the drive IC 60W, a diode 62W, a smoothing capacitor 63W, a negative-voltage power supply 64W and a capacitor 65W. In addition, both the driving of the V-phase upper-arm switch SVp and the driving of the W-phase upper-arm switch SWp are similar to the above-described driving of the U-phase upper-arm switch SUp; therefore, explanation of the driving of the V-phase upper-arm switch SVp and the driving of the W-phase upper-arm switch SWp is omitted hereinafter.

Next, the lower-arm configuration of the inverter 30 will be described.

As shown in FIG. 2, for the U-phase, V-phase and W-phase lower-arm switches SUn, SVn and SWn, there are respectively provided drive ICs 70U, 70V and 70W. Moreover, electric power is supplied to all the drive ICs 70U, 70V and 70W from a common insulated power supply.

Specifically, to a first end of a secondary coil 71 of a transformer, there is connected the anode of a diode 72. Here, the secondary coil 71 constitutes the common insulated power supply. Further, to the cathode of the diode 72, there is connected a positive-electrode-side electrical path 80p. On the other hand, to a second end of the secondary coil 71, there is connected a negative-electrode-side electrical path 80n.

Further, for driving the U-phase lower-arm switch SUn, to the positive-electrode-side electrical path 80p, there are connected both a first end of a U-phase smoothing capacitor 73U and a power supply terminal of the U-phase drive IC 70U. On the other hand, to the negative-electrode-side electrical path 80n, there are connected both a second end of the U-phase smoothing capacitor 73U and a ground terminal of the U-phase drive IC 70U.

Moreover, to the source of the U-phase lower-arm switch SUn, there are connected both a positive electrode terminal of a negative-voltage power supply 74 and a first end of a U-phase capacitor 75U. Here, the negative-voltage power supply 74 is a voltage generation circuit. On the other hand, both a negative electrode terminal of the negative-voltage power supply 74 and a second end of the U-phase capacitor 75U are connected to the negative-electrode-side electrical path 80n.

For driving the V-phase lower-arm switch SVn, to the positive-electrode-side electrical path 80p, there are connected both a first end of a V-phase smoothing capacitor 73V and a power supply terminal of the V-phase drive IC 70V. On the other hand, to the negative-electrode-side electrical path 80n, there are connected both a second end of the V-phase smoothing capacitor 73V and a ground terminal of the V-phase drive IC 70V.

Moreover, to the source of the V-phase lower-arm switch SVn, there is connected a first end of a V-phase capacitor 75V, but no negative-voltage power supply. On the other hand, a second of the V-phase capacitor 75V is connected to the negative-electrode-side electrical path 80n.

Similarly, for driving the W-phase lower-arm switch SWn, to the positive-electrode-side electrical path 80p, there are connected both a first end of a W-phase smoothing capacitor 73W and a power supply terminal of the W-phase drive IC 70W. On the other hand, to the negative-electrode-side electrical path 80n, there are connected both a second end of the W-phase smoothing capacitor 73W and a ground terminal of the W-phase drive IC 70W.

Moreover, to the source of the W-phase lower-arm switch SWn, there is connected a first end of a W-phase capacitor 75W, but no negative-voltage power supply. On the other hand, a second of the W-phase capacitor 75W is connected to the negative-electrode-side electrical path 80n.

In the present embodiment, electric power is supplied to all the power supply terminals of the U-phase, V-phase and W-phase drive ICs 70U, 70V and 70W from the common insulated power supply, i.e., from the same secondary coil 71. Consequently, it becomes possible to reduce variation in the voltages supplied to the gates of the U-phase, V-phase and W-phase lower-arm switches SUn, SVn and SWn when ON-driving these lower-arm switches.

In addition, in the present embodiment, both the positive-electrode-side electrical path 80p and the negative-electrode-side electrical path 80n are formed as wiring patterns on a circuit board included in the inverter 30. Moreover, all of the drive ICs 60U, 60V, 60W, 70U, 70V and 70W, the smoothing capacitors 63U, 63V, 63W, 73U, 73V and 73W, the negative-voltage power supplies 64U, 64V, 64W and 74 and the capacitors 65U, 65V, 65W, 75U, 75V and 75W are provided on the circuit board.

As described above, in the present embodiment, the negative-voltage power supply 74 is provided for only the U-phase lower-arm switch SUn among the U-phase, V-phase and W-phase lower-arm switches SUn, SVn and SWn. Consequently, it becomes possible to simplify the configuration of the inverter 30 in comparison with the case of providing three negative-voltage power supplies respectively for the U-phase, V-phase and W-phase lower-arm switches SUn, SVn and SWn.

Moreover, in the present embodiment, the negative electrode terminal of the negative-voltage power supply 74 is connected with the negative-electrode-side electrical path 80n. Consequently, with the simple configuration including the single negative-voltage power supply 74, the negative-electrode-side electrical path 80n and the V-phase and W-phase capacitors 75V and 75W, it becomes possible to supply the negative gate voltage (−VN) also to the gates of the V-phase and W-phase lower-arm switches SVn and SWn which have no negative-voltage power supply connected directly thereto.

Figure 3:
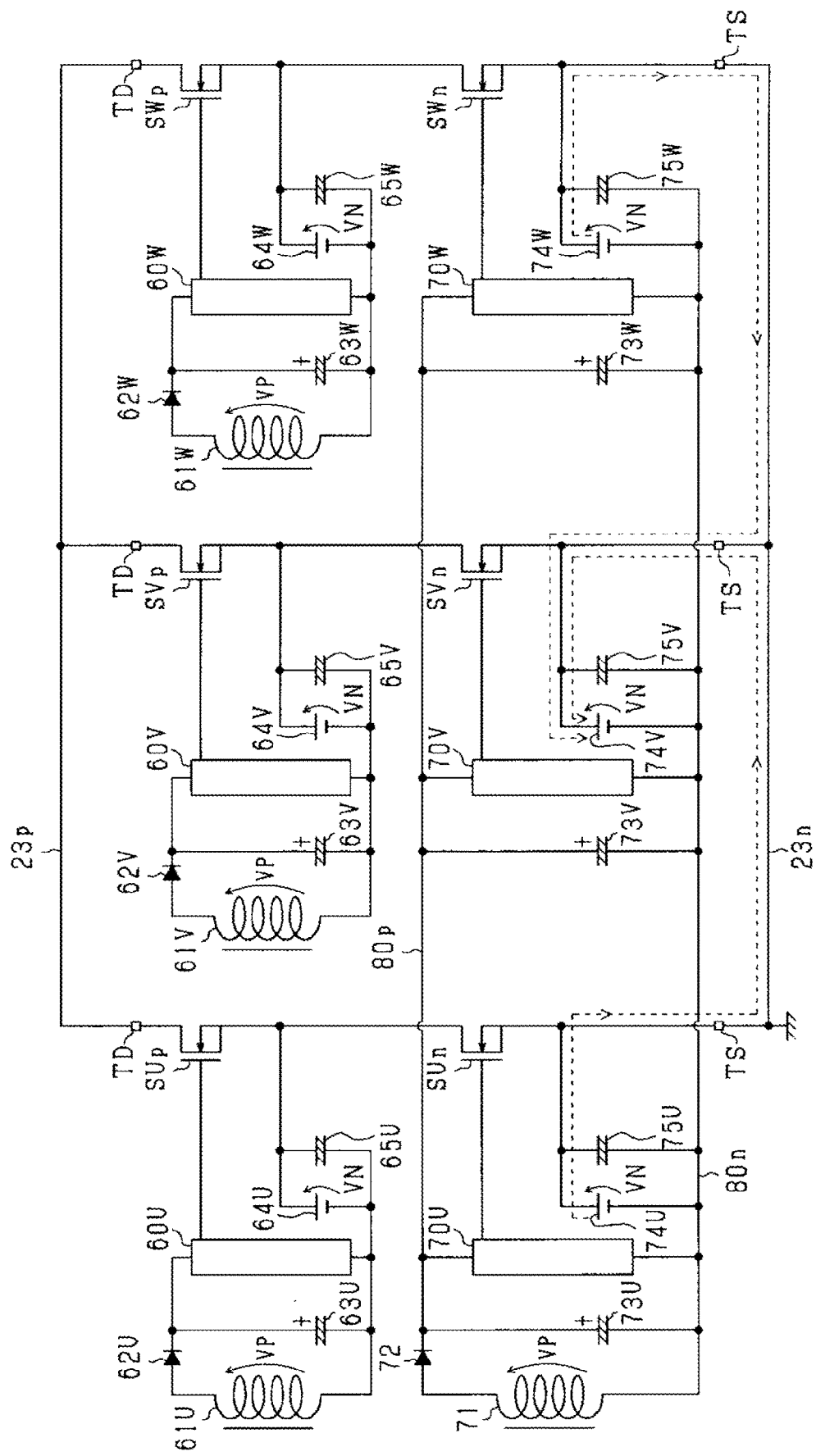
FIG. 3 is a schematic circuit diagram showing drive ICs of upper-arm and lower-arm switches and their peripheral devices in an inverter according to a comparative example.

In contrast, in a comparative example shown in FIG. 3, there are provided U-phase, V-phase and W-phase negative-voltage power supplies 74U, 74V and 74W respectively for the U-phase, V-phase and W-phase lower-arm switches SUn, SVn and SWn. Consequently, the configuration of the inverter becomes complicated.

Moreover, in the comparative example, when the output voltage of any of the U-phase, V-phase and W-phase negative-voltage power supplies 74U, 74V and 74W becomes lower than the output voltages of the other negative-voltage power supplies, diverting of current will occur due to the use of the common insulated power supply for all the U-phase, V-phase and W-phase drive ICs 70U, 70V and 70W. For example, when the output voltage of the V-phase negative-voltage power supply 74V becomes lower than the output voltages of the U-phase and W-phase negative-voltage power supplies 74U and 74W, diverting of current will occur as indicated by the dashed-line arrows in FIG. 3. Consequently, the actual loads of the U-phase and W-phase negative-voltage power supplies 74U and 74W will become higher than design loads thereof. As a result, the U-phase and W-phase negative-voltage power supplies 74U and 74W may become overheated, lowering the reliability thereof. In contrast, in the present embodiment, for supplying the negative gate voltage (−VN) to all the gates of the U-phase, V-phase and W-phase lower-arm switches SUn, SVn and SWn, only the U-phase lower-arm switch SUn is provided with the negative-voltage power supply 74 while the V-phase and W-phase lower-arm switches SVn and SWn are provided with only the capacitors 75V and 75W that are passive elements. Consequently, it becomes possible to prevent occurrence of the above-described problems with the comparative example.

Second Embodiment

An inverter 30 according to the second embodiment has a similar configuration to the inverter 30 according to the first embodiment. Therefore, the differences therebetween will be mainly described hereinafter.

In the first embodiment, the negative-voltage power supply 74 is provided as an external device to the U-phase drive IC 70U (see FIG. 2).

Figure 4:
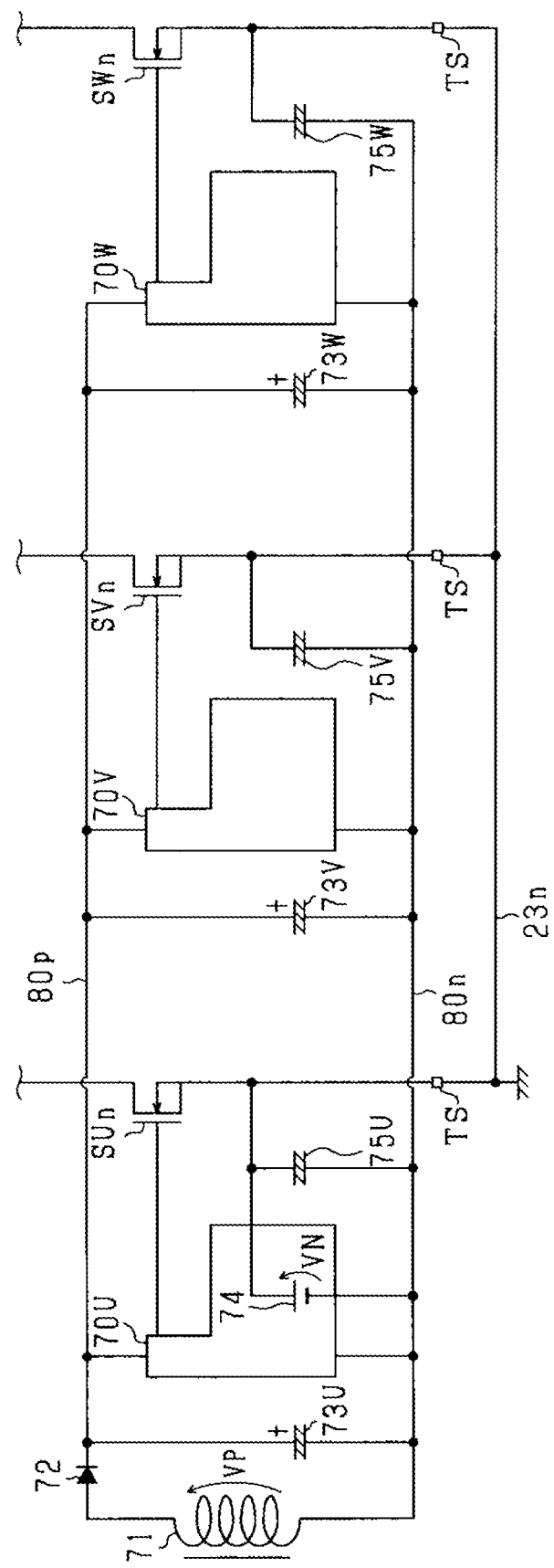
FIG. 4 is a schematic circuit diagram showing drive ICs of lower-arm switches and their peripheral devices in an inverter according to a second embodiment.

In contrast, in the present embodiment, as shown in FIG. 4, the negative-voltage power supply 74 is built in the U-phase drive IC 70U. Consequently, it becomes possible to reduce the parts count of the inverter 30 and simplify the configuration of the inverter 30. In addition, in FIG. 4, there is shown only the lower-arm configuration of the inverter 30 according to the present embodiment.

Third Embodiment

An inverter 30 according to the third embodiment has a similar configuration to the inverter 30 according to the second embodiment. Therefore, the differences therebetween will be mainly described hereinafter.

Figure 5:
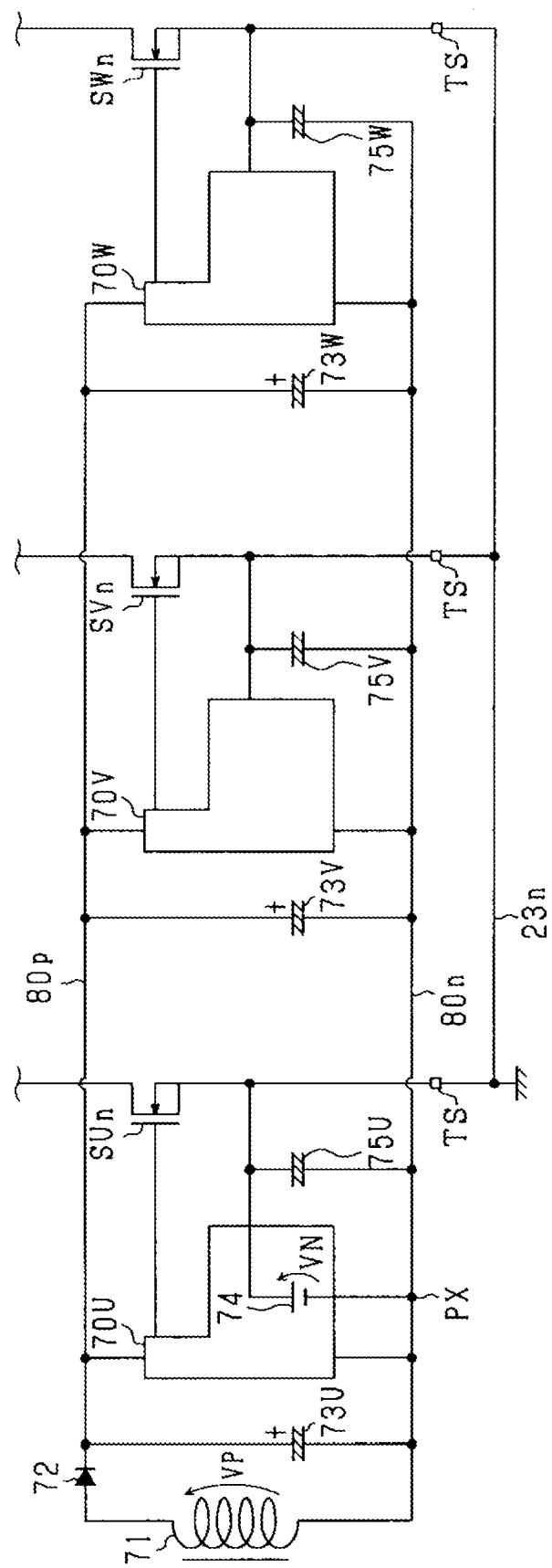
FIG. 5 is a schematic circuit diagram showing drive ICs of lower-arm switches and their peripheral devices in an inverter according to a third embodiment.

Referring to FIG. 5, in the present embodiment, of the U-phase, V-phase and W-phase lower-arm drive ICs 70U, 70V and 70W, the V-phase and W-phase lower-arm drive ICs 70V and 70W, which have no negative-voltage power supply built therein, are further configured to respectively monitor the voltages of the V-phase and W-phase capacitors 75V and 75W. In addition, in FIG. 5, there is shown only the lower-arm configuration of the inverter 30 according to the present embodiment.

For some reason, the output voltage of the negative-voltage power supply 74 may deviate considerably from the target voltage VN. In this case, the voltages of the V-phase and W-phase capacitors 75V and 75W also deviate considerably from the target voltage VN. Consequently, it may become impossible to reliably suppress occurrence of self turn-on of the V-phase and W-phase lower-arm switches SVn and SWn.

In view of the above, in the present embodiment, the V-phase and W-phase lower-arm drive ICs 70V and 70W respectively monitor the voltages of the V-phase and W-phase capacitors 75V and 75W and determine, based on the monitoring results, whether the voltages of the V-phase and W-phase capacitors 75V and 75W are deviated from the target voltage VN.

Figure 6:
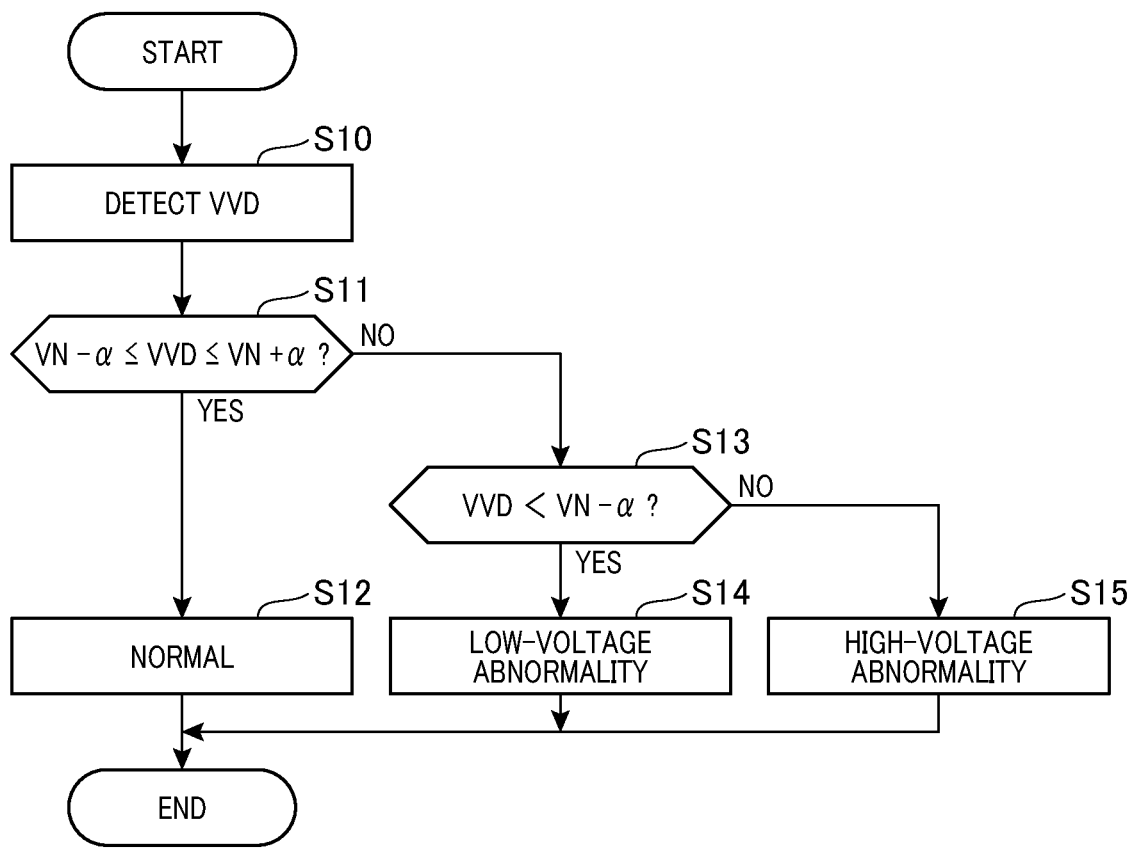
FIG. 6 is a flow chart illustrating a process of determining voltage abnormalities of a capacitor according to the third embodiment.

Next, with reference to FIG. 6, explanation will be given of a voltage abnormality determination process performed by the V-phase drive IC 70V for determining voltage abnormalities of the V-phase capacitor 75V.

First, in step S10, the V-phase drive IC 70V detects the voltage VVD of the V-phase capacitor 75V.

Then, in step S11, the V-phase drive IC 70V determines whether the detected voltage VVD is within a predetermined range of (VN−α) to (VN+α) which includes the target voltage VN. In other words, the V-phase drive IC 70V determines whether the detected voltage VVD is higher than or equal to (VN−α) and lower than or equal to (VN+α). In addition, α is predetermined value (e.g., 1V).

If the determination in step S11 results in a "YES" answer, i.e., if the detected voltage VVD is within the predetermined range, then the process proceeds to step S12.

In step S12, the V-phase drive IC 70V determines that the voltage VVD of the V-phase capacitor 75V is normal.

On the other hand, if the determination in step S11 results in a "NO" answer, i.e., if the detected voltage VVD is outside the predetermined range, then the process proceeds to step S13.

In step S13, the V-phase drive IC 70V further determines whether the detected voltage VVD is lower than the lower limit (VN−α) (e.g., 3V) of the predetermined range.

If the determination in step S13 results in a "YES" answer, i.e., if the detected voltage VVD is lower than the lower limit (VN−α), then the process proceeds to step S14.

In step S14, the V-phase drive IC 70V determines that a low-voltage abnormality has occurred. Here, the low-voltage abnormality denotes an abnormality in which the voltage VVD of the V-phase capacitor 75V becomes lower than the target voltage VN.

In addition, upon determination of the low-voltage abnormality in step S14, the controller 50 may send the U-phase drive IC 70U a command to increase the target voltage VN of the negative-voltage power supply 74. In this case, in the U-phase drive IC 70U, the amount of increase in the target voltage VN may be set to, for example, (VN−VVD). Consequently, it would become possible to make the voltage VVD of the V-phase capacitor 75V approach the target voltage VN.

On the other hand, if the determination in step S13 results in a "NO" answer, i.e., if the detected voltage VVD is not lower than the lower limit (VN−α), then the V-phase drive IC 70V determines that the detected voltage VVD is higher than the upper limit (VN+α) (e.g., 5V) of the predetermined range. Thereafter, the process proceeds to step S15.

In step S15, the V-phase drive IC 70V determines that a high-voltage abnormality has occurred. Here, the high-voltage abnormality denotes an abnormality in which the voltage VVD of the V-phase capacitor 75V becomes higher than the target voltage VN.

In addition, upon determination of the high-voltage abnormality in step S15, the controller 50 may send the U-phase drive IC 70U a command to lower the target voltage VN of the negative-voltage power supply 74. In this case, in the U-phase drive IC 70U, the amount of decrease in the target voltage VN may be set to, for example, (VDD−VN). Consequently, it would become possible to make the voltage VVD of the V-phase capacitor 75V approach the target voltage VN.

The W-phase drive IC 70W also performs a voltage abnormality determination process for determining voltage abnormalities of the W-phase capacitor 75W. The voltage abnormality determination process performed by the W-phase drive IC 70W is similar to the above-described voltage abnormality determination process performed by the V-phase drive IC 70V. Therefore, explanation of the voltage abnormality determination process performed by the W-phase drive IC 70W is omitted hereinafter.

As above, according to the present embodiment, it becomes possible to accurately determine whether abnormalities have occurred in the voltages of the V-phase and W-phase capacitors 75V and 75W.

[Modifications of Third Embodiment]

In the above-described third embodiment, when it is determined that an abnormality has occurred in the detection function of the U-phase capacitor 75U, the U-phase drive IC 70U, which has the negative-voltage power supply 74 built therein, may perform processes of: acquiring either of the voltages of the V-phase and W-phase capacitors 75V and 75W detected respectively by the V-phase and W-phase drive ICs 70V and 70W that have no negative-voltage power supply built therein; and operating the negative-voltage power supply 74 so as to feed-back-control the acquired voltage to the target voltage VN.

In the above-described third embodiment, when the detected voltage VVD is determined to be lower than (VN−a) and close to 0V, the V-phase drive IC 70V may determine that a short-circuit fault of the V-phase capacitor 75V has occurred.

Fourth Embodiment

An inverter 30 according to the fourth embodiment has a similar configuration to the inverter 30 according to the first embodiment. Therefore, the differences therebetween will be mainly described hereinafter.

Figure 7:
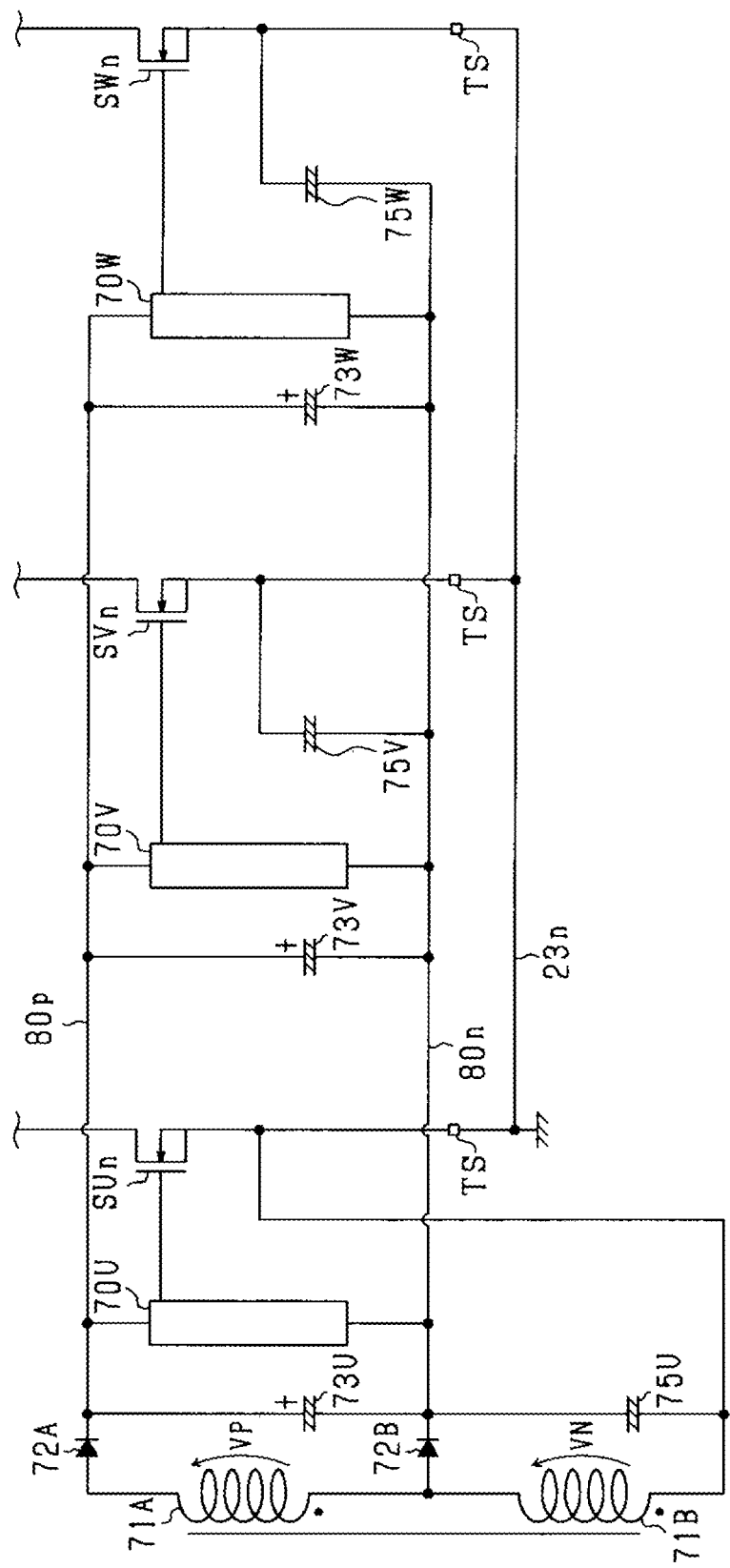
FIG. 7 is a schematic circuit diagram showing drive ICs of lower-arm switches and their peripheral devices in an inverter according to a fourth embodiment.

As shown in FIG. 7, the inverter 30 according to the present embodiment includes first and second secondary coils 71A and 71B and first and second diodes 72A and 72B, whereas the inverter 30 according to the first embodiment includes the secondary coil 71 and the diode 72 (see FIG. 2). Moreover, the first secondary coil 71A and the first diode 72A of the inverter 30 according to the present embodiment are respectively identical to the secondary coil 71 and the diode 72 of the inverter 30 according to the first embodiment. In addition, in FIG. 7, there is shown only the lower-arm configuration of the inverter 30 according to the present embodiment.

To a first end (i.e., positive-electrode-side end) of the second secondary coil 71B that constitutes an insulated power supply, there are connected both the first end of the U-phase capacitor 75U and the source of the U-phase lower-arm switch Sun. Moreover, both a second end (i.e., negative-electrode-side end) of the second secondary coil 71B and a second end of the first secondary coil 71A are connected to the negative-electrode-side electrical path 80n. Furthermore, in the negative-electrode-side electrical path 80n, there is provided the second diode 72B between the second end of the second secondary coil 71B and the ground terminal of the U-phase drive IC 70U. The second end of the U-phase capacitor 75U is connected to the cathode of the second diode 72B. In addition, in the present embodiment, the second secondary coil 71B and the second diode 72B together constitute a voltage generation circuit.

In the present embodiment, the insulated power supplies are configured so that the polarity at the second end of the first secondary coil 71A and the polarity at the first end of the second secondary coil 71B are the same. Moreover, the output voltage VN (e.g, 4V) of the second secondary coil 71B is lower than the output voltage (i.e., power supply voltage VP) of the first secondary coil 71A. The negative voltage (−VN) generated by the second secondary coil 71B is supplied to the gates of the U-phase, V-phase and W-phase lower-arm switches SUn, SVn and SWn.

As above, according to the present embodiment, with the simple configuration including the second secondary coil 71B and the second diode 72B, it becomes possible to realize a negative-voltage power supply for supplying the negative voltage (−VN) to the gates of the U-phase, V-phase and W-phase lower-arm switches SUn, SVn and SWn.

Fifth Embodiment

An inverter 30 according to the fifth embodiment has a similar configuration to the inverter 30 according to the first embodiment. Therefore, the differences therebetween will be mainly described hereinafter.

Figure 8:
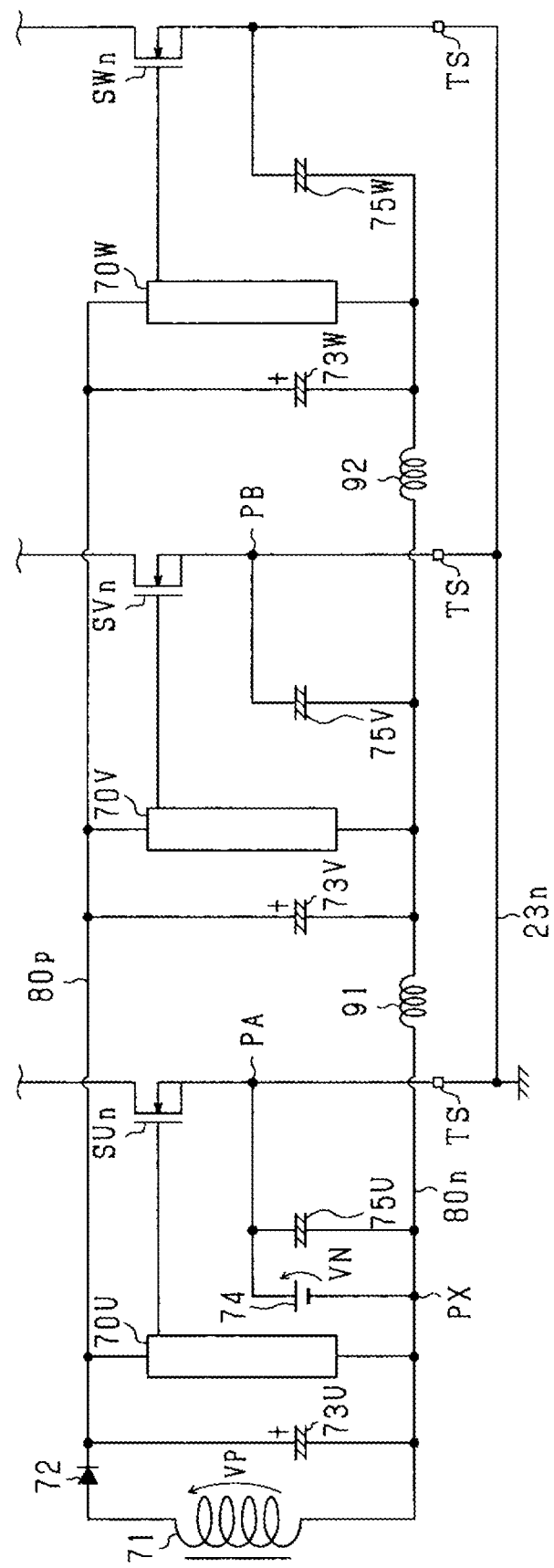
FIG. 8 is a schematic circuit diagram showing drive ICs of lower-arm switches and their peripheral devices in an inverter according to a fifth embodiment.

In the present embodiment, as shown in FIG. 8, there are provided inductors in the negative-electrode-side electrical path 80n. In addition, in FIG. 8, there is shown only the lower-arm configuration of the inverter 30 according to the present embodiment.

Specifically, in the present embodiment, in the negative-electrode-side electrical path 80n, there is provided a first negative-electrode-side inductor 91 between a junction point PX between the negative-electrode-side electrical path 80n and the negative-voltage power supply 74 and a junction point between the negative-electrode-side electrical path 80n and the V-phase smoothing capacitor 73V. Moreover, in the negative-electrode-side electrical path 80n, there is also provided a second negative-electrode-side inductor 92 between the junction point between the negative-electrode-side electrical path 80n and the V-phase smoothing capacitor 73V and a junction point between the negative-electrode-side electrical path 80n and the W-phase smoothing capacitor 73W.

The reason for providing the inductors in the negative-electrode-side electrical path 80n will be described with reference to FIG. 9 and taking the first negative-electrode-side inductor 91 as an example.

Figure 9:
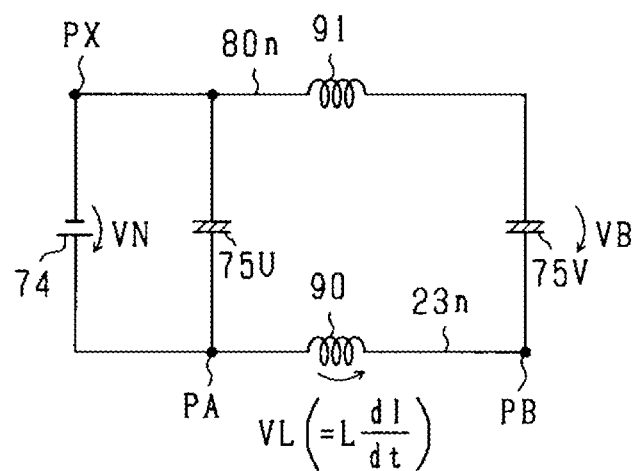
FIG. 9 is a schematic circuit diagram showing an equivalent circuit of a closed circuit that includes a negative-voltage power supply, a negative-electrode-side inductor and their peripheral devices in the inverter according to the fifth embodiment.

In FIG. 9, PA designates the positive electrode terminal side of the negative-voltage power supply 74; and PB designates the first end side of the V-phase capacitor 75V. FIG. 9 shows an equivalent circuit of a closed circuit that includes the negative-voltage power supply 74, PA, the negative-electrode-side conductive member 23n, PB, the V-phase capacitor 75V, the negative-electrode-side electrical path 80n and PX shown in FIG. 8.

Moreover, in FIG. 9, the reference numeral 90 designates the inductance component of the negative-electrode-side conductive member 23n; and VL represents the counter electromotive force generated in the negative-electrode-side conductive member 23n when electric current I from the corresponding winding of the rotating electric machine 40 flows through the negative-electrode-side conductive member 23n. In addition, VL=L×dI/dt, where L is the inductance of the inductance component 90.

First, explanation will be given of the case where the first negative-electrode-side inductor 91 is not provided in the negative-electrode-side electrical path 80n. The output voltage of the negative-voltage power supply 74 is controlled to the target voltage VN with reference to the electric potential at PX. When the electric current I flows through the negative-electrode-side conductive member 23n, the counter electromotive force VL is generated in the negative-electrode-side conductive member 23n. In this case, the voltage VB of the V-phase capacitor 75V, which depends on the electric potential at PX, becomes lower than VN by VL, i.e., VB=VN−VL. Consequently, it may become impossible to supply a suitable negative voltage to the gate of the V-phase lower-arm switch SVn.

In contrast, in the present embodiment, the first negative-electrode-side inductor 91 is provided in the negative-electrode-side electrical path 80n. In this case, a voltage will be generated in the first negative-electrode-side inductor 91, making the electric potential on the V-phase capacitor 75V side higher than the electric potential at PX. Consequently, it becomes possible to suppress decrease in the voltage VB of the V-phase capacitor 75V even with the counter electromotive force VL generated in the negative-electrode-side conductive member 23n. As a result, it becomes possible to more reliably suppress occurrence of self turn-on of the V-phase lower-arm switch SVn.

Moreover, with the first negative-electrode-side inductor 91 provided in the negative-electrode-side electrical path 80n, it also becomes possible to more reliably suppress occurrence of diverting of current described in the first embodiment.

Sixth Embodiment

An inverter 30 according to the sixth embodiment has a similar configuration to the inverter 30 according to the fifth embodiment. Therefore, the differences therebetween will be mainly described hereinafter.

Figure 10:
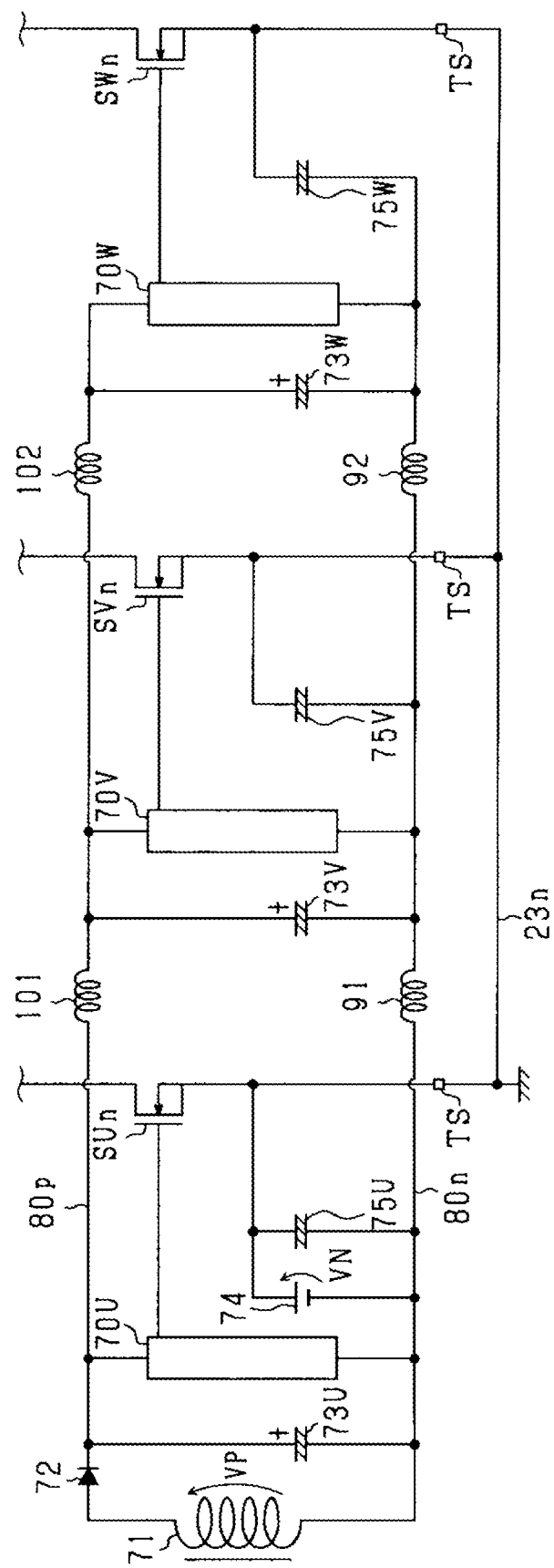
FIG. 10 is a schematic circuit diagram showing drive ICs of lower-arm switches and their peripheral devices in an inverter according to a sixth embodiment.

In the present embodiment, as shown in FIG. 10, there are provided inductors also in the positive-electrode-side electrical path 80p. In addition, in FIG. 10, there is shown only the lower-arm configuration of the inverter 30 according to the present embodiment.

Specifically, in the present embodiment, in the positive-electrode-side electrical path 80p, there is provided a first positive-electrode-side inductor 101 between a junction point between the positive-electrode-side electrical path 80p and the power supply terminal of the U-phase drive IC 70U and a junction point between the positive-electrode-side electrical path 80p and the V-phase smoothing capacitor 73V. Moreover, in the positive-electrode-side electrical path 80p, there is also provided a second positive-electrode-side inductor 102 between the junction point between the positive-electrode-side electrical path 80p and the V-phase smoothing capacitor 73V and a junction point between the positive-electrode-side electrical path 80p and the W-phase smoothing capacitor 73W.

With the first positive-electrode-side inductor 101 provided in the positive-electrode-side electrical path 80p, it becomes possible to stabilize the voltage of the V-phase smoothing capacitor 73V. Consequently, it becomes possible to suppress decrease in the gate voltage when the V-phase lower-arm switch SVn is turned to the ON state, thereby suppressing increase in the switching loss. Moreover, with the second positive-electrode-side inductor 102 provided in the positive-electrode-side electrical path 80p, it becomes possible to stabilize the voltage of the W-phase smoothing capacitor 73W. Consequently, it becomes possible to suppress increase in the switching loss when the W-phase lower-arm switch SWn is turned to the ON state.

Seventh Embodiment

An inverter 30 according to the seventh embodiment has a similar configuration to the inverters 30 according to the fifth and sixth embodiments. Therefore, the differences therebetween will be mainly described hereinafter.

Figure 11:
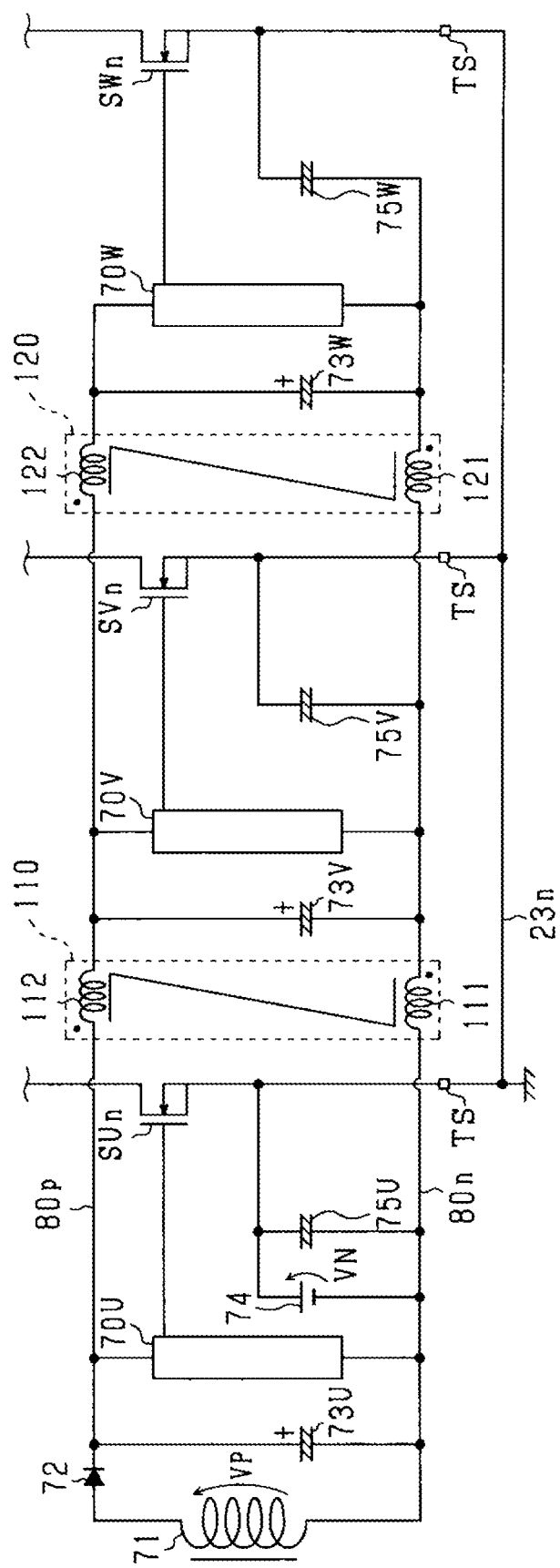
FIG. 11 is a schematic circuit diagram showing drive ICs of lower-arm switches and their peripheral devices in an inverter according to a seventh embodiment.

In the present embodiment, as shown in FIG. 11, each corresponding pair of the inductors provided in the negative-electrode-side electrical path 80n and the inductors provided in the positive-electrode-side electrical path 80p are integrated into a single component (i.e., common inductor). In addition, in FIG. 11, there is shown only the lower-arm configuration of the inverter 30 according to the present embodiment.

Specifically, in the present embodiment, the pair of a first negative-electrode-side inductor 111 provided in the negative-electrode-side electrical path 80n and a first positive-electrode-side inductor 112 provided in the positive-electrode-side electrical path 80p are magnetically coupled with each other to together form a first common inductor 110. In addition, the first common inductor 110 is formed so that the polarity at the closer one of two ends of the first negative-electrode-side inductor 111 to the second end of the V-phase smoothing capacitor 73V and the polarity at the closer one of two ends of the first positive-electrode-side inductor 112 to the first end of the secondary coil 71 are the same.

Similarly, the pair of a second negative-electrode-side inductor 121 provided in the negative-electrode-side electrical path 80n and a second positive-electrode-side inductor 122 provided in the positive-electrode-side electrical path 80p are magnetically coupled with each other to together form a second common inductor 120. In addition, the second common inductor 120 is formed so that the polarity at the closer one of two ends of the second negative-electrode-side inductor 121 to the second end of the W-phase smoothing capacitor 73W and the polarity at the closer one of two ends of the second positive-electrode-side inductor 122 to the power supply terminal of the V-phase drive IC 70V are the same.

With employment of the common inductors 110 and 120, it becomes possible to reduce the parts count of the inverter 30.

Moreover, with the first common inductor 110, it becomes possible to reduce the amount of voltage drop in the first positive-electrode-side inductor 112 when electric current is supplied from the first end of the secondary coil 71 to the V-phase smoothing capacitor 73V. Consequently, it becomes possible to accurately perform the supply of electric current from the first end of the secondary coil 71 to the V-phase smoothing capacitor 73V, thereby suppressing decrease in the gate voltage when the V-phase lower-arm switch SVn is turned to the ON state.

Similarly, with the second common inductor 120, it becomes possible to reduce the amount of voltage drop in the second positive-electrode-side inductor 122 when electric current is supplied from the first end of the secondary coil 71 to the W-phase smoothing capacitor 73W. Consequently, it becomes possible to suppress decrease in the gate voltage when the W-phase lower-arm switch SWn is turned to the ON state.

Eighth Embodiment

An inverter 30 according to the eighth embodiment has a similar configuration to the inverter 30 according to the first embodiment. Therefore, the differences therebetween will be mainly described hereinafter.

Figure 12:
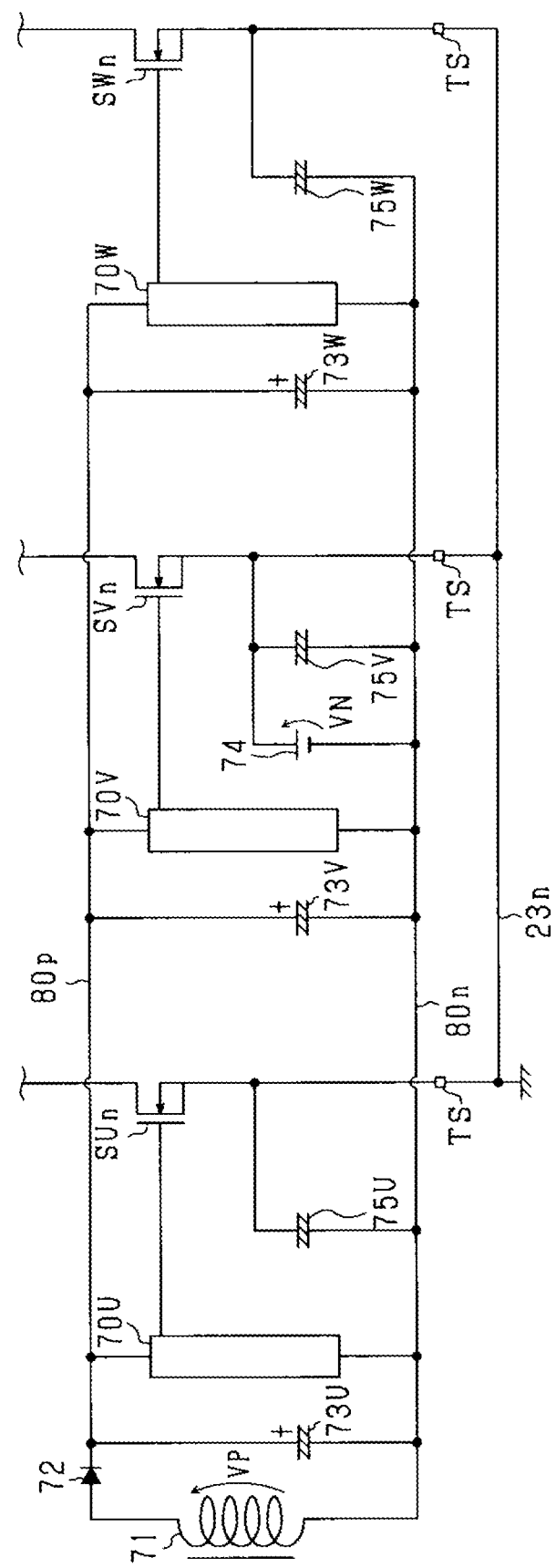
FIG. 12 is a schematic circuit diagram showing drive ICs of lower-arm switches and their peripheral devices in an inverter according to an eighth embodiment.

In the present embodiment, as shown in FIG. 12, the negative-voltage power supply 74 is connected to the source of the V-phase lower-arm switch SVn, instead of to the source of the U-phase lower-arm switch SUn as in the first embodiment (see FIG. 2). In addition, in FIG. 12, there is shown only the lower-arm configuration of the inverter 30 according to the present embodiment.

Figure 13A:
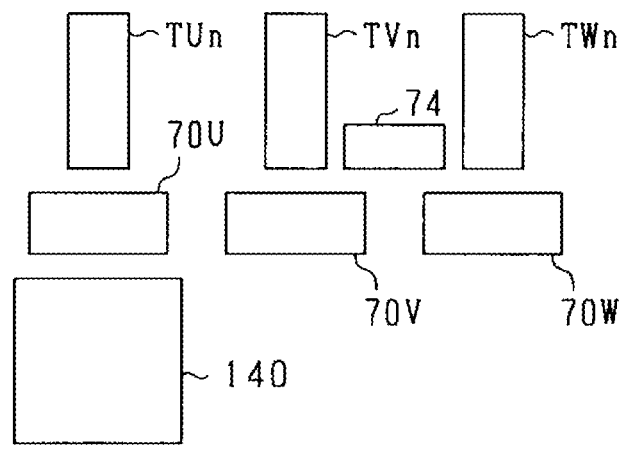
FIG. 13(a) is a schematic diagram illustrating the arrangement of a negative-voltage power supply on a circuit board of the inverter according to the eighth embodiment.

FIG. 13(a) illustrates the arrangement of the negative-voltage power supply 74 on a major surface of a circuit board of the inverter 30 according to the present embodiment.

As shown in FIG. 13(a), on the circuit board of the inverter 30, there are provided U-phase, V-phase and W-phase connection portions TUn, TVn and TWn to which the gates of the U-phase, V-phase and W-phase lower-arm switches SUn, SVn and SWn are respectively connected. The connection portions TUn, TVn and TWn are aligned in a row on the circuit board. Moreover, on the circuit board, there are also provided, in the vicinity of the connection portions TUn, TVn and TWn, the U-phase, V-phase and W-phase drive ICs 70U, 70V and 70W so as to be aligned in a row. In addition, on the circuit board, there is also provided the transformer 140 that includes the secondary coil 71.

In the present embodiment, the negative-voltage power supply 74 is arranged between the V-phase and W-phase connection portions TVn and TWn on the circuit board.

With the above arrangement, it becomes possible to prevent the length of the electrical path from the negative electrode terminal of the negative-voltage power supply 74 to the ground terminal of the V-phase drive IC 70V, the length of the electrical path from the negative electrode terminal of the negative-voltage power supply 74 to the ground terminal of the U-phase drive IC 70U and the length of the electrical path from the negative electrode terminal of the negative-voltage power supply 74 to the ground terminal of the W-phase drive IC 70W from becoming considerably different from each other. Consequently, it becomes possible to suppress decrease in the negative voltage supplied to the gates of the U-phase, V-phase and W-phase lower-arm switches SUn, SVn and SWn.

[Modification of Eighth Embodiment]

Figure 13B:
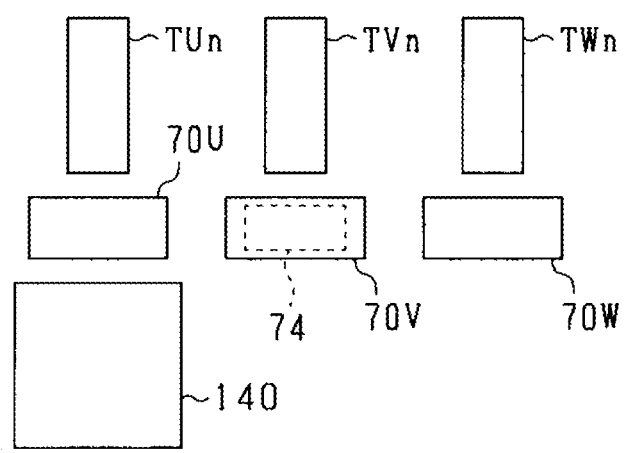
FIG. 13(b) is a schematic diagram illustrating the arrangement of a negative-voltage power supply on a circuit board of an inverter according to a modification of the eighth embodiment.

In the above-described eighth embodiment, the negative-voltage power supply 74 may be built in the V-phase drive IC 70V as in the second embodiment. In this case, the negative-voltage power supply 74 would be located at a position as shown in FIG. 13(b).

Ninth Embodiment

An inverter 30 according to the ninth embodiment has a similar configuration to the inverter 30 according to the eighth embodiment. Therefore, the differences therebetween will be mainly described hereinafter.

Figure 14:
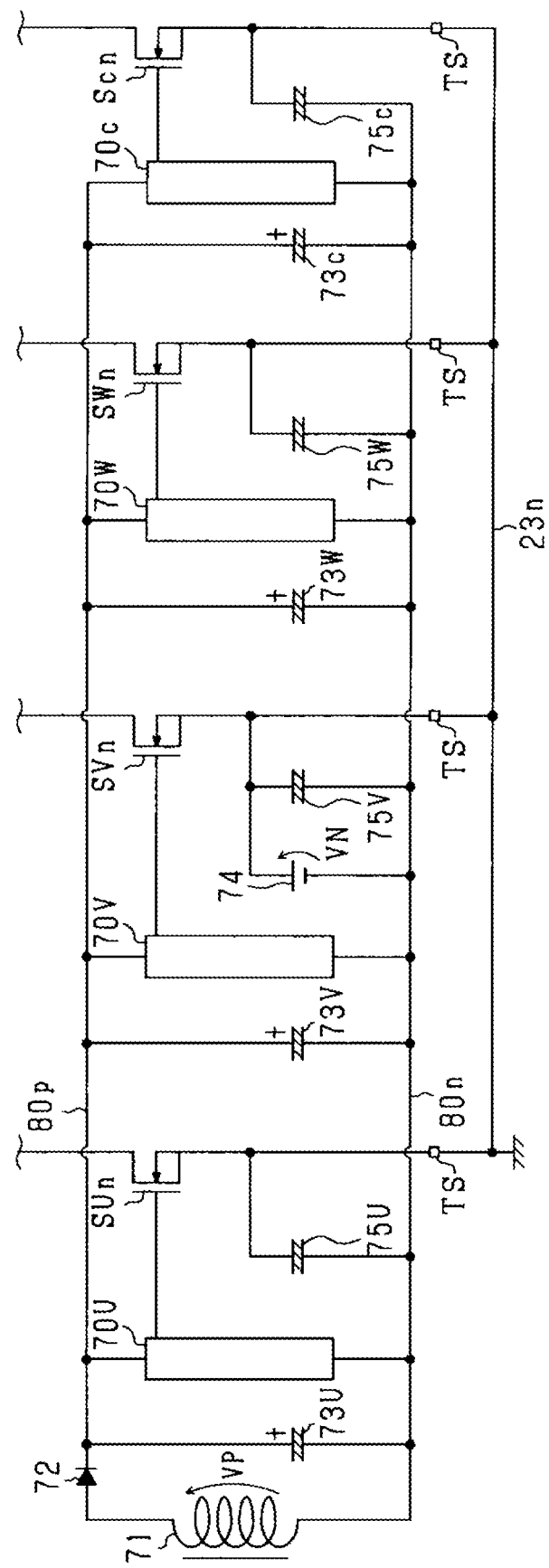
FIG. 14 is a schematic circuit diagram showing drive ICs of lower-arm switches and their peripheral devices in an inverter according to a ninth embodiment.

In the present embodiment, as shown in FIG. 14, the lower-arm boost switch Scn also shares the negative-voltage power supply 74 with the U-phase, V-phase and W-phase lower-arm switches SUn, SVn and SWn. In addition, in FIG. 14, there is shown only the lower-arm configuration of the inverter 30 according to the present embodiment.

As shown in FIG. 14, a drive IC 70c, a smoothing capacitor 73c and a capacitor 75c are provided for driving the lower-arm boost switch Scn.

Figure 15A:
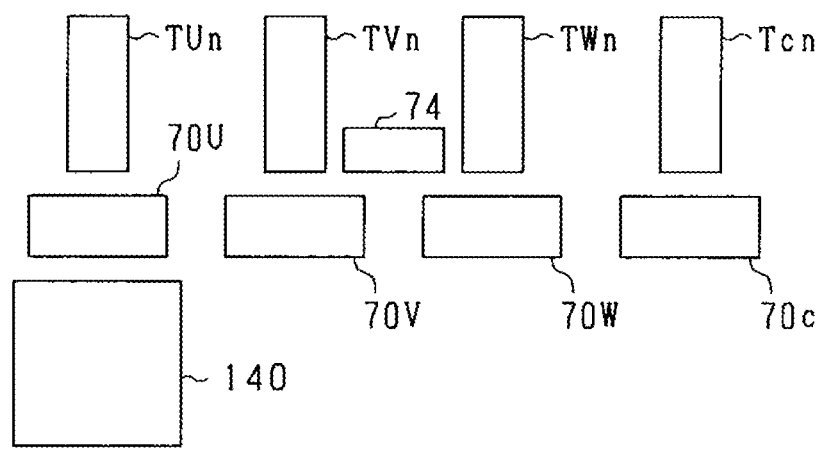
FIG. 15(a) is a schematic diagram illustrating the arrangement of a negative-voltage power supply on a circuit board of the inverter according to the ninth embodiment.

FIG. 15(a) illustrates the arrangement of the negative-voltage power supply 74 on a major surface of a circuit board of the inverter 30 according to the present embodiment.

As shown in FIG. 15(a), on the circuit board of the inverter 30, there is provided a boost connection portion Tcn to which the gate of the lower-arm boost switch Scn is connected. Moreover, on the circuit board, there is provided, in the vicinity of the boost connection portion Tcn, the drive IC 70c for driving the lower-arm boost switch Scn.

In the present embodiment, the negative-voltage power supply 74 is arranged between the V-phase and W-phase connection portions TVn and TWn on the circuit board as in the eighth embodiment. Consequently, it becomes possible to achieve the same advantageous effects as described in the eighth embodiment.

[Modification of Ninth Embodiment]

Figure 15B:
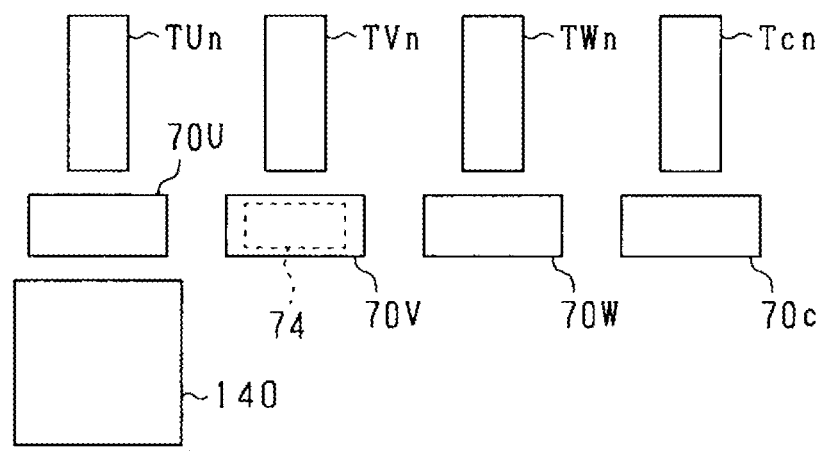
FIG. 15(b) is a schematic diagram illustrating the arrangement of a negative-voltage power supply on a circuit board of an inverter according to a modification of the ninth embodiment.

In the above-described ninth embodiment, the negative-voltage power supply 74 may be built in the V-phase drive IC 70V as in the second embodiment. In this case, the negative-voltage power supply 74 would be located at a position as shown in FIG. 15(b).

While the above particular embodiments and modifications have been shown and described, it will be understood by those skilled in the art that various further modifications, changes, and improvements may be made without departing from the spirit of the present disclosure.

For example, in the first embodiment, for each of the U-phase, V-phase and W-phase switch pairs, the upper-arm and lower-arm switches of the switch pair are together modularized to form one module. Alternatively, each of the upper-arm and lower-arm switches may be individually modularized to form one module.

Figure 16:
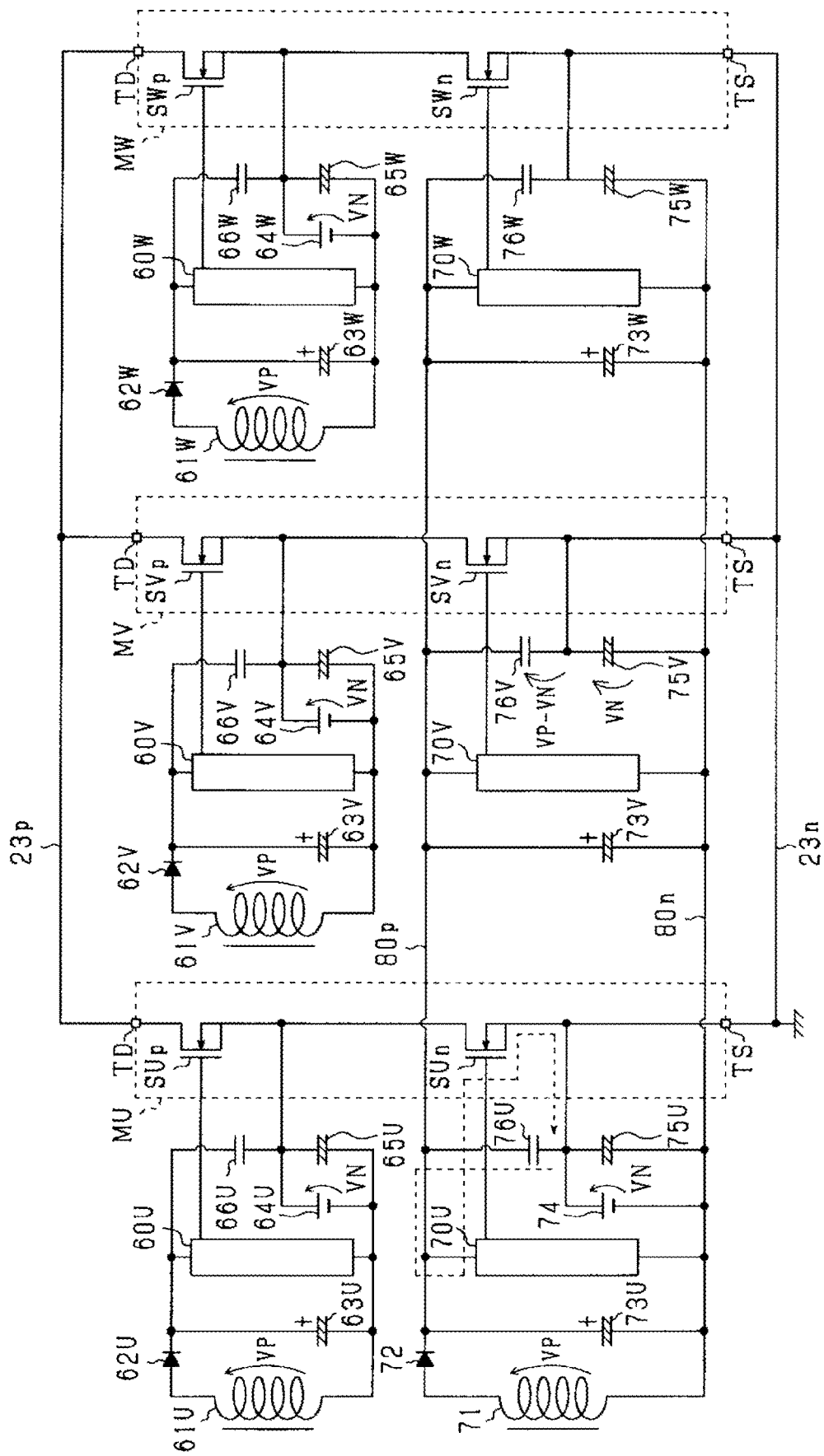
FIG. 16 is a schematic circuit diagram showing drive ICs of upper-arm and lower-arm switches and their peripheral devices in an inverter according to a modification of the first embodiment.

Moreover, as shown in FIG. 16, the inverter 30 according to the first embodiment may be modified to further include capacitors 66U, 66V, 66W, 76U, 76V and 76W. Each of the capacitors 66U, 66V, 66W, 76U, 76V and 76W is provided, for a corresponding one of the upper-arm and lower-arm switches SUp, SUn, SVp, SVn, SWp and SWn, to supply electric charge to the gate of the corresponding switch when the corresponding switch is turned to the ON state. In this modification, the capacitors 66U, 66V, 66W, 76U, 76V and 76W are employed in view of the fact that each of the smoothing capacitors 63U, 63V, 63W, 73U, 73V and 73W is located far away from the gate of a corresponding one of the upper-arm and lower-arm switches SUp, SUn, SVp, SVn, SWp and SWn. In addition, in FIG. 16, an electric charge supply path from the capacitor 76U to the gate of the U-phase lower-arm switch SUn is indicated by a dashed-line arrow.

What is claimed is:

1. An electric power converter comprising a plurality of switch pairs respectively corresponding to a plurality of phases and each consisting of an upper-arm switch and a lower-arm switch, wherein
    each of the lower-arm switches of the switch pairs has a first terminal, a second terminal and a gate,
    each of the lower-arm switches is configured to be turned to an ON state in response to a potential difference of the gate with respect to the second terminal becoming higher than or equal to a threshold voltage and turned to an OFF state in response to the potential difference becoming lower than the threshold voltage, and
    each of the lower-arm switches allows electric current to flow from the first terminal to the second terminal in the ON state and blocks electric current from flowing from the first terminal to the second terminal in the OFF state,
  the electric power converter further comprising:
    a voltage generation circuit having its positive electrode side connected to the second terminal of only one of the lower-arm switches of the switch pairs;
    a negative-electrode-side electrical path connected to a negative electrode side of the voltage generation circuit; and
    at least one capacitor having a first end connected to the second terminal of one of the remainder of the lower-arm switches of the switch pairs, which is not connected with the voltage generation circuit, and a second end connected to the negative-electrode-side electrical path.

2. The electric power converter as set forth in claim 1, further comprising a negative-electrode-side inductor that is provided, in the negative-electrode-side electrical path, between a junction point between the negative-electrode-side electrical path and the negative electrode side of the voltage generation circuit and a junction point between the negative-electrode-side electrical path and the second end of the capacitor.

3. The electric power converter as set forth in claim 2, further comprising:
a positive-electrode-side electrical path connected to a positive electrode side of an electric power supply; and
a plurality of drive ICs each of which is provided individually for a corresponding one of the lower-arm switches of the switch pairs,
wherein
the negative-electrode-side electrical path is connected to a negative electrode side of the electric power supply,
each of the drive ICs is connected with the positive-electrode-side electrical path, the negative-electrode-side electrical path and the gate of the corresponding lower-arm switch to drive the corresponding lower-arm switch with electric power supplied from the electric power supply via the positive-electrode-side electrical path,
in the positive-electrode-side electrical path, there is provided a positive-electrode-side inductor between a junction point between the positive-electrode-side electrical path and one of the drive ICs and a junction point between the positive-electrode-side electrical path and another of the drive ICs, and
the positive-electrode-side inductor and the negative-electrode-side inductor are magnetically coupled with each other and integrated into a single component.

4. The electric power converter as set forth in claim 1, further comprising:
a secondary coil of a transformer, the secondary coil constituting an insulated power supply; and
a positive-electrode-side electrical path connected to a first end of the secondary coil,
wherein
the negative-electrode-side electrical path is connected to a second end of the secondary coil.

5. The electric power converter as set forth in claim 4, wherein
the secondary coil is a first secondary coil,
the electric power converter further comprises a second secondary coil of the transformer, the second secondary coil constituting the voltage generation circuit,
the second terminal of the only one of the lower-arm switches is connected to a positive electrode side of the second secondary coil, and
the negative-electrode-side electrical path is connected to a negative electrode side of the second secondary coil.

6. The electric power converter as set forth in claim 1, further comprising a circuit board having a plurality of connection portions to which the gates of the lower-arm switches of the switch pairs are respectively connected,
wherein
the connection portions are aligned in a row on the circuit board, and
the voltage generation circuit is arranged on the circuit board so as to be located, in the alignment direction of the connection portions, between two of the connection portions which are respectively located at two ends of the row.

7. The electric power converter as set forth in claim 1, further comprising a plurality of drive ICs each of which is provided individually for a corresponding one of the lower-arm switches of the switch pairs and connected with the gate of the corresponding lower-arm switch to drive the corresponding lower-arm switch,
wherein
the voltage generation circuit is built in, among the plurality of drive ICs, the drive IC that drives the lower-arm switch connected with the voltage generation circuit,
the drive IC having the voltage generation circuit built therein is configured to control an output voltage of the voltage generation circuit to a target voltage, and
each of the remainder of the plurality of drive ICs other than the drive IC having the voltage generation circuit built therein is configured to:
monitor a voltage of a corresponding capacitor, which is connected with the lower-arm switch driven by the drive IC, of the at least one capacitor; and
determine, based on a result of the monitoring, whether an abnormality has occurred in which the voltage of the corresponding capacitor is deviated from the target voltage.

* * * * *